United States Patent [19]

Nagase et al.

[11] Patent Number: 5,411,630

[45] Date of Patent: May 2, 1995

[54] MAGNETIC DISK MANUFACTURING METHOD

[75] Inventors: Norikazu Nagase, Odawara; Yoshihiro Moriguchi, Hiratsuka; Youichi Inomata, Odawara; Hiroshi Yashiki, Odawara; Masaki Ohura, Odawara; Yoshiki Kato, Tokyo, all of Japan

[73] Assignee: Hitachi, Ltd., Tokyo, Japan

[21] Appl. No.: 149,770

[22] Filed: Nov. 10, 1993

[30] Foreign Application Priority Data

Nov. 12, 1992 [JP] Japan .................................. 4-302167

[51] Int. Cl.$^6$ .............................................. B44C 1/22
[52] U.S. Cl. .......................................... 216/22; 216/42; 216/58
[58] Field of Search ................ 156/630, 643, 646, 655, 156/656, 659.1, 904; 427/458, 474, 475, 481, 484; 118/621, 627, 629; 29/603

[56] References Cited

U.S. PATENT DOCUMENTS 4,664,748 12/1987 Ueno et al. .................... 156/659.1
4,726,006 2/1988 Benne et al. ................. 156/659.1 X
5,240,558 8/1993 Kawasak et al. .............. 156/904 X

FOREIGN PATENT DOCUMENTS 3-252922 11/1991 Japan .

*Primary Examiner*—William Powell
*Attorney, Agent, or Firm*—Evenson, McKeown, Edwards & Lenahan

[57] ABSTRACT

A method of forming projections on major surfaces of a disk comprises the steps of supporting the disk in a space, spraying a multiplicity of fine solid particles into the space, charging the sprayed fine solid particles with electricity of the same polarity so that the fine solid particles are floating in the space in a mutually separated state due to electric repellent forces acting between the fine solid particles, electrostatically depositing the fine solid particles charged with electricity on the surfaces of the disk, and etching the disk surfaces by using the deposited fine solid particles as masks, thereby forming a multiplicity of projections on the disk surfaces.

23 Claims, 6 Drawing Sheets

MAGNETIC DISK MANUFACTURING METHOD

BACKGROUND OF THE INVENTION

1. Field of the Invention

The present invention relates to a magnetic disk manufacturing method and apparatus, a magnetic disk, and a magnetic disk apparatus, and more particularly, to a method and an apparatus suitable for manufacturing magnetic disks with protective films coated thereon or magnetic disks with a multiplicity of solid fine particles electrostatically coated on the surfaces of a disk base plate, a magnetic disk manufactured by the above method and apparatus, as well as a magnetic disk apparatus including such a magnetic disk.

2. Description of the Prior Art

Hitherto, sticking of sputtered disks to magnetic heads has been prevented by forming circumferential texture grooves in a substrate as a base plate of the magnetic disk. These texture grooves simultaneously serve to give the magnetic disk a magnetic anisotropy. Thus, the provision of texture grooves has aimed at both establishment of a magnetic anisotropy and prevention of sticking of disks to heads.

With a higher density and downsizing of magnetic disks, however, flying of magnetic heads at a lower level and an improvement in magnetic characteristics have become important problems. Under this situation, it has been required to make minimum working on a disk base plate only enough to give the magnetic disk a magnetic anisotropy, provide a smooth magnetic film with a constant thickness, and improve magnetic characteristics. When the disk base plate is subjected to minimum working for satisfying the above requirements, roughness of the disk surface is too small to ensure prevention of sticking of disks to heads. This requires that the prevention of sticking be ensured by the surface configuration of a protective film.

To solve the above problem, Japanese Unexamined Patent Publication No. 3-252922 discloses a method of forming a mask on a protective film of a magnetic disk by photolithographic process, and etching the protective film through the mask to form desired projections on the surface of the protective film.

Thus, in the prior art disclosed in Japanese Unexamined Patent Publication No. 3-252922, the desired surface configuration of a magnetic disk is obtained by etching the protective film through the mask formed by the photolithographic process. The disclosed method, however, has problems that the time required for manufacture is long and the use of various chemicals leads to a high possibility of danger.

As a technique for solving the above problems, known is a method of depositing fine solid particles on the surface of a protective film and using the fine solid particles as etching masks. It is easily conceivable to deposit such fine solid particles on the disk surface by spin coating process, spraying process, or dipping process into a suspension. These processes, however, accompany problems of large variations in a particle-deposited area ratio in the disk surface, inability to produce masks of substantially uniform size because of fine particles being likely to agglomerate, and difficulties in washing away the solid particles after etching.

SUMMARY OF THE INVENTION

In view of the afore-mentioned problems of the prior art, an object of the present invention is to provide a magnetic disk manufacturing method and apparatus by which a particle-deposited area ratio in the disk surface can be freely controlled and a multiplicity of fine solid particles can be deposited on the disk surface independently of one another without becoming agglomerated together, thereby producing masks of uniform size, a magnetic disk manufactured by the above method and apparatus, as well as a magnetic disk apparatus including such a magnetic disk.

According to one aspect of the present invention, there is provided a magnetic disk manufacturing method including the steps of:

preparing a magnetic disk with a protective film formed on its surface and supporting the magnetic disk in a space;

preparing a multiplicity of fine solid particles;

spraying the multiplicity of fine solid particles into the space;

charging the multiplicity of sprayed fine solid particles with electricity of the same polarity so that the fine solid particles are floating in the space in a mutually separated state due to electric repellent forces acting between the fine solid particles;

electrostatically depositing the fine solid particles charged with electricity on at least one portion of an outer surface of the protective film; and etching the at least one portion of the outer surface of the protective film by using the deposited fine solid particles as masks, thereby forming a multiplicity of projections on the outer surface of the protective film.

The second and subsequent steps in the aforementioned method of the present invention are also applicable to the process for forming a multiplicity of projections on the surface of a base plate for the magnetic disk, i.e., the disk surface before a magnetic layer and the protective film are formed thereon.

According to another aspect of the present invention, there is provided a magnetic disk having a protective film formed on its surface, wherein a multiplicity of projections are formed in at least one portion of an outer surface of the protective film, and assuming that the height of undulation of the outer surface of the protective film is A nm and the floating height of a magnetic head used in cooperation with the magnetic disk is B nm, the height of the projections is not more than (B−A) nm and the diameter of each of circles equivalent to those of the projections is not more than ¼ of the width of a head slider of the magnetic head.

According to a further aspect of the present invention, there is provided a magnetic disk apparatus comprising the magnetic disk pointed out above and a magnetic head used in cooperation with the magnetic disk.

According to a still further aspect of the present invention, there is provided a base plate for a magnetic disk, wherein a multiplicity of projections are formed in at least one portion of an outer surface of the base plate, and assuming that the height of undulation of the outer surface of the base plate is A nm and the floating height of a magnetic head used in cooperation with a completed magnetic disk is B nm, the height of the projections is not more than (B−A) nm and the diameter of each of the circles equivalent to those of the projections is not more than ¼ of the width of a head slider of the magnetic head.

According to a still further aspect of the present invention, there is provided a magnetic disk apparatus comprising a magnetic disk including the base plate pointed out above and a magnetic head used in cooperation with the magnetic disk.

According to a still further aspect of the present invention, there is provided a magnetic disk manufacturing apparatus comprising:

means for supporting a magnetic disk in a space, said disk having a protective film formed on its surface;

means for spraying a multiplicity of fine solid particles into the space;

means for charging the thus sprayed fine solid particles with electricity of the same polarity so that the fine solid particles are floating in the space in a mutually separated state due to electric repellent forces acting between the fine solid particles; and electrostatically depositing the fine solid particles charged with electricity on at least one portion of an outer surface of the protective film of the magnetic disk.

According to a still further aspect of the present invention, there is provided a disk manufacturing apparatus comprising:

means for supporting a disk such that major portions of both surfaces of the disk are exposed to a first space;

fine particle supply means for injecting a suspension of a multiplicity of fine solid particles and a disperser into a second space so that the disperser is evaporated and the multiplicity of fine solid particles are floating in the second space in a mutually separated state;

spray means for spraying the thus separated fine solid particles and the evaporated disperser from the second space toward the major portions of both surfaces of the supported disk; and voltage applying means disposed adjacent spray nozzles of the spray means for charging the sprayed fine solid particles with electricity of the same polarity, whereby the multiplicity of fine solid particles charged with electricity of the same polarity are electrostatically coated on the major portions of both surfaces of the disk.

According to a still further aspect of the present invention, there is provided a method of forming projections on at least major portions of both surfaces of a disk, the method comprising the steps of:

supporting the disk such that the major portions of both surfaces of the disk are exposed to a first space;

injecting a suspension of a multiplicity of fine solid particles and a disperser into a second space so that the disperser is evaporated and the multiplicity of fine solid particles are floating in the second space in a mutually separated state;

spraying the thus separated fine solid particles and the evaporated disperser from the second space through spray means toward the major portions of both surfaces of the supported disk; and charging the sprayed fine solid particles with electricity of the same polarity;

electrostatically coating the multiplicity of fine solid particles charged with electricity on the major portions of both surfaces of the disk, and controlling a deposited area ratio of the fine solid particles in both surfaces of the disk by carrying out at least one of selecting a grain size of the fine solid particles, controlling a content of the fine solid particles in the suspension and changing the relative positions of the spray means with respect to both surfaces of the disk.

The above and other objects, features and advantages of the present invention will become more apparent from the following description with reference to the drawings.

DETAILED DESCRIPTION OF THE EMBODIMENTS

Figure 1:
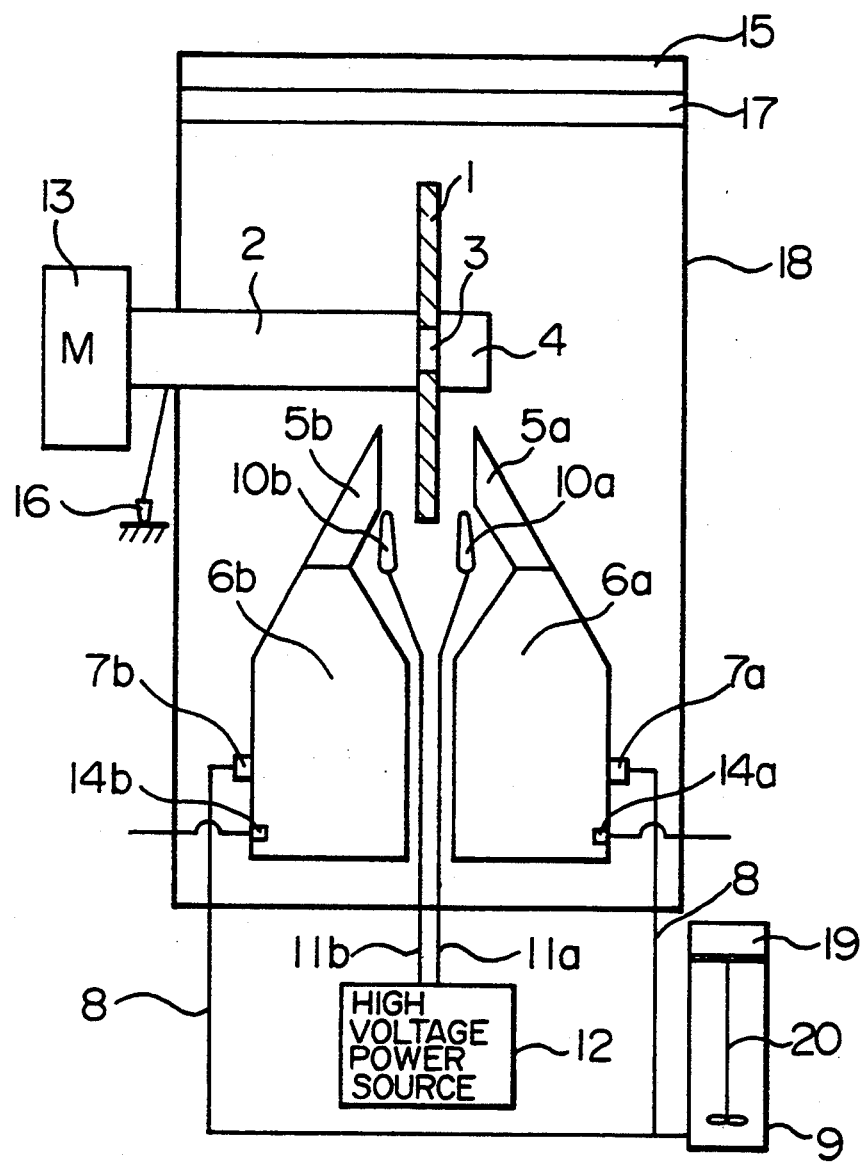
FIG. 1 is a block diagram of a first embodiment of a magnetic disk manufacturing apparatus of the present invention.

Referring first to FIG. 1 and FIGS. 2A to 2D, one embodiment of a magnetic disk manufacturing apparatus of the present invention includes a box-shaped housing 18 with a motor 13 mounted on one side of the housing. A spindle 2 is coupled to a rotary shaft of the motor 13 and horizontally and rotatably extends into an inner space of the housing 18 through the one side of the housing 18. A chuck 3 is provided at the inner end of the spindle 2. A magnetic disk 1 is attached by the chuck to the spindle 2 coaxially therewith. A central portion of the disk 1 attached to the spindle 2 is covered by a cap 4 for the purpose described later. The spindle 2 is electrically grounded by a grounding needle 16 and so is the magnetic disk 1.

Figure 2A:
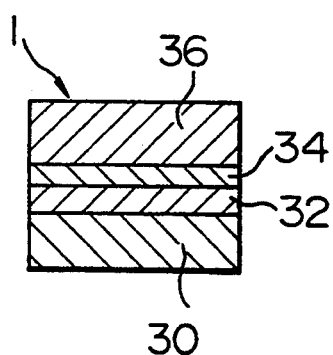
FIGS. 2A to 2D are enlarged fragmentary sectional views of a magnetic disk, respectively showing successive steps of one embodiment of a magnetic disk manufacturing method of the present invention.
Figure 2B:
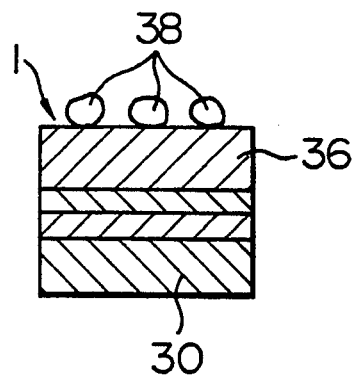

The magnetic disk 1 comprises, as shown in FIG. 2A, a base plate 30, an underlying layer or inner layer 32 covering the base plate 30, a magnetic layer 34 covering an outer surface of the inner layer 32, and a carbon protective film or layer 36 covering an outer surface of the magnetic layer. A magnetic disk having such a multi-layered structure is well known in the art and is prepared beforehand and carried into the apparatus shown in FIG. 1.

A fan 15 is provided at the top of the housing 18 with a filter 17 disposed between the fan 15 and the inner space of the housing 18. Disposed within the housing 18 are a pair of spray nozzles 5a and 5b positioned respectively to face both surfaces of the magnetic disk 1. The spray nozzles 5a and 5b are connected to upper ends of a pair of hollow generators 6a and 6b provided in the housing 18. Injection nozzles 7a and 7b are mounted on side walls of the generators 6a and 6b, respectively. The injection nozzles 7a and 7b are each connected by a feed tube 8 to a tank 9 disposed outside the housing 18. Disposed within the tank 9 is an agitator 20 rotatively driven by a second motor 19. Gas nozzles 14a and 14b are mounted on the afore-mentioned side walls of the generators 6a and 6b, respectively, at positions beneath the injection nozzles 7a and 7b. In a space between the pair of spray nozzles 5a and 5b, a pair of voltage applying needles 10a and 10b are disposed on both sides of the magnetic disk 1 at substantially the same level as the lower end of the magnetic disk 1 attached to the spindle 2. The voltage applying needles 10a and 10b are connected through power cables 11a and 11b, respectively, to a high voltage power source 12 disposed outside the housing 18.

Prior to operating the apparatus shown in FIG. 1, the magnetic disk 1 prepared as mentioned above in another place is attached to the spindle 2 by the chuck 3 such that one surface of the disk is held in close contact with an end face of the spindle 2 while a central portion of the other surface of the disk 1 is covered by the cap 4.

Fluorine-contained resin particles and a fluorine-contained solvent are put into the tank 9 at any desired ratio and then mixed and agitated by the agitator 20 driven by the motor 19 so that the fluorine-contained resin particles are dispersed into the fluorine-contained solvent to prepare a suspension. The suspension is supplied through the feed tubes 8 to the injection nozzles 7a and 7b for injection into the generators 6a and 6b. Of the suspension injected through the injection nozzles 7a and 7b, the solvent is evaporated and the fluorine-contained resin particles are brought into a state in which the particles are floating in inner spaces of the generators 6a and 6b. The fluorine-contained resin particles in such a floating state are sprayed through the spray nozzles 5a and 5b toward both surfaces of the magnetic disk 1 with carrier gas (e.g., high pressure air or nitrogen gas) blown out of the gas nozzles 14a and 14b. At this time, the spindle 2 is rotated by the motor 13 at a speed ranging from 20 rpm to 1000 rpm.

Since the voltage applying needles 10a and 10b are connected to the high voltage power source 12 through the power cables 11a and 11b, there occur high voltage electric fields between the magnetic disk 1 and respective spray nozzles 5a and 5b so that the fluorine-contained resin particles emitted from the spray nozzles 5a and 5b are charged with electricity under those electric fields. Since the magnetic disk 1 is grounded through the spindle 2 and held in a state of zero potential, a potential difference produced between the fluorine-contained resin particles and the magnetic disk 1 causes the particles to be attracted to and deposited on the surface of the magnetic disk 1. Furthermore, the fluorine-contained resin particles charged with electricity repel each other, so that individual particles are kept independently of each other in the space and, thus, will not be deposited on other particles which have already been deposited on the disk surface. As a result, a deposition layer of fluorine-contained resin particles 38 is formed on the surface of the magnetic disk 1 (FIG. 2B) except for its central portion sandwiched by the spindle 2 and the cap 4.

The magnetic disk 1, the generators 5a and 5b, etc. are shielded by the housing 18 from the external environment. Accordingly, by stably introducing clean air free of dust and dirt into the apparatus through the filter 17 by the fan 15 disposed at the top of the apparatus, it is possible to prevent dust and dirt from depositing on the surface of the magnetic disk 1 and to maintain the fluorine-contained resin particles in a stable deposited state.

Figure 2C:
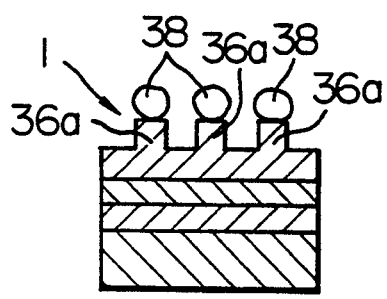
Figure 2D:
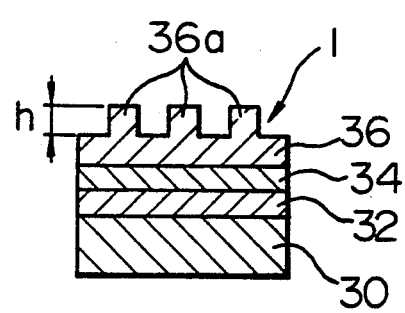

Then, the magnetic disk with the fluorine-contained resin particles deposited thereon is subjected to dry etching for 15 seconds by using oxygen gas (FIG. 2C). The areas of the protective film 36 except for those portions where the fluorine-contained resin particles 38 are deposited on the film surface are evenly etched away and, thereafter, the disk 1 is washed by using pure water to remove the particles 38 (FIG. 2D). As a result, projections 36a having a height of h are formed on the protective film surface of the magnetic disk 1.

The washing using pure water can be carried out with a small amount of the water and finished in a short period of time. This is because the fluorine-contained resin particles have repellency against water (i.e., hydrophobicity) (by way of example, fluorine-contained resin particles float on water although their specific gravity is not less than 2). The repellency between a washing fluid and fine particles of the mask material should be properly selected depending on combinations. In the case of using water, for example, the contact angle between the water and the fine particles of the mask material should desirably be not less than about 90 degrees. The washing carried out in the above step is different from normal washing in which the washing fluid that has an affinity with contaminants is selected to make the contaminants dispersed in the washing fluid to wash them away.

Additionally, in the first embodiment of the magnetic disk manufacturing apparatus shown in FIG. 1, the housing 18, the spindle 2 and other parts on which the fluorine-contained resin particles should not be deposited are preferably made of an insulating material.

In addition to the above-mentioned case in which the projections 36a are formed on the surface of the magnetic disk 1 provided with the protective film 36, the method of the present invention is also applicable to the case where projections 30a are formed on the surface of a disk 1a before the inner layer 32, the magnetic layer 34 and the protective layer 36 are coated thereon, i.e., on the surface of the base plate 30. The latter case can be practiced just by changing the gas for use in the dry etching step from oxygen gas used in the embodiment shown in FIGS. 2A to 2D to argon gas (when the base plate 30 is made of aluminum). The steps in the latter case are illustrated in FIGS. 3A to 3D so as to avoid repeated description of these steps. After the projections 30a have been formed on the surface of the base plate 30, an inner layer 32a, a magnetic layer 34a and a protective layer 36a are formed one after another on the base plate 30 to complete a magnetic disk 1a, as shown in FIG. 3E. These layers 32a, 34a and 36a are so thin that the protective layer 36a is provided on its outer surface with projections 36a' similar to the projections 36a shown in FIG. 2D.

The magnetic disks 1 and 1a may preferably be further provided with lubricating layers (not shown) on the outer surfaces of the protective layers 36 and 36a, respectively.

Note that the fluorine-contained resin particles used in the method of the present invention are preferably of a regular grain size distribution for better dispersion into the solvent in the tank 9.

Figure 4:
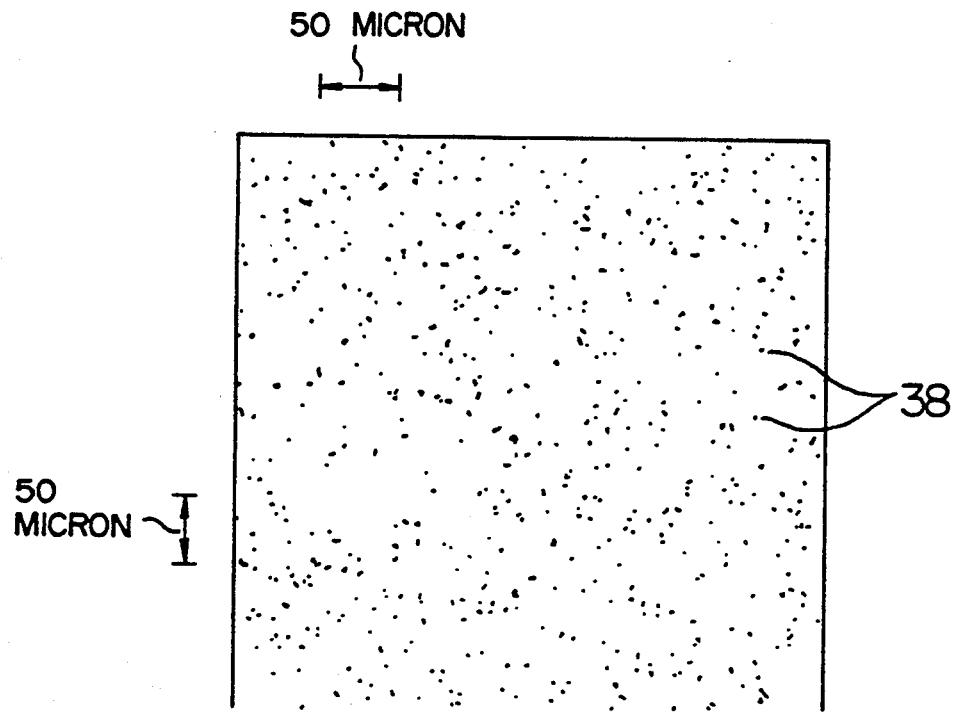
FIG. 4 illustrates a deposited state of fine solid particles on the disk surface resulted from the step shown in FIG. 2B or 3B.

FIG. 4 illustrates an enlarged image obtained by photographing a particle-deposited magnetic disk surface and printing it out by a video printer. As can be apparent from FIG. 4, almost all of the fluorine-contained resin particles 38 are deposited on the magnetic disk surface in a state where the particles are independent one from another.

Figure 5:
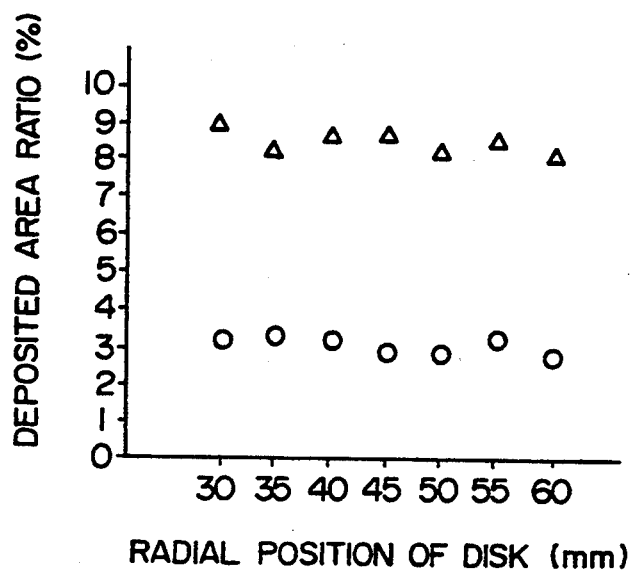
FIGS. 5 and 6 are graphs showing distributions of a deposited area ratio of fine solid particles which are electrostatically deposited on the magnetic disk surface by the method and apparatus of the present invention, respectively in the radial and circumferential directions of the magnetic disk.

FIG. 5 shows a distribution, in the radial direction of the magnetic disk, of a deposited area ratio of the fluorine-contained resin particles which are deposited on the magnetic disk surface by the apparatus shown in FIG. 1. Here, the term "deposited area ratio" means a particle deposited area per unit area of the magnetic disk surface (percent). In FIG. 5, small circles and triangles indicate results obtained by depositing the particles under first and second conditions, respectively.

Figure 6:
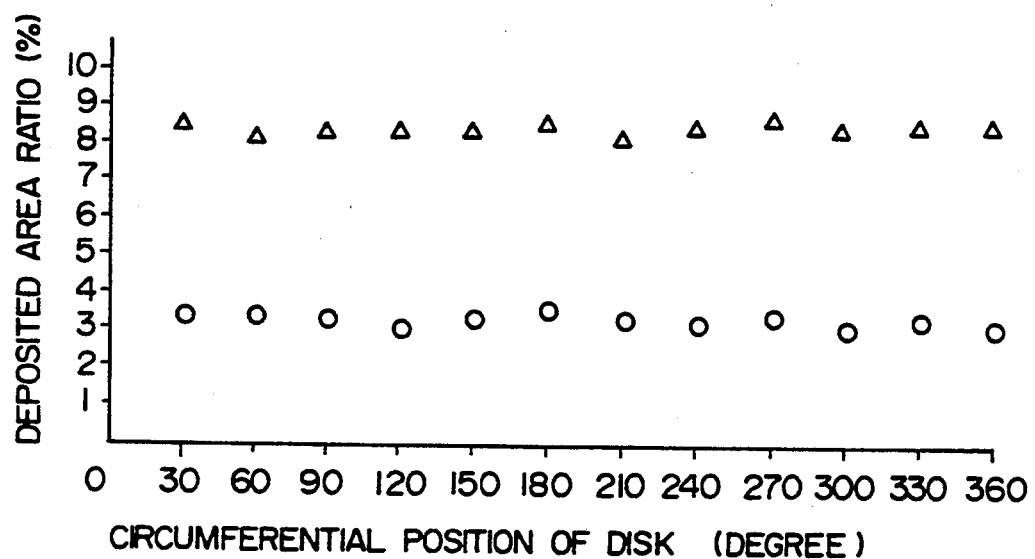

FIG. 6 shows a distribution, in the circumferential direction of the magnetic disk, of a deposited area ratio of the fluorine-contained resin particles which are deposited under the first conditions (small circles) and the second conditions (triangles). While FIGS. 5 and 6 each show only two examples of the deposited area ratios of 3% and 8%, it has been confirmed from experimental test results that the deposited area ratio ranging from 0.3 to 30% can be obtained.

The deposited area ratio of the fluorine-contained resin particles which are deposited on the surface of the protective film 36 or the base plate 30 of the magnetic disk can be optionally controlled for different regions of the disk surface such as those close to an inner peripheral edge or an outer peripheral edge of the magnetic disk, by changing relative positions of the magnetic disk 1 and the injection nozzles 5a and 5b, or content of the fluorine-contained resin particles in the suspension prepared within the tank 9, or the grain size of the fluorine-contained resin particles used. With this embodiment, therefore, fine solid particles can be deposited at any desired deposited area ratio in any desired portions of the disk surface by controlling the conditions for depositing the fine solid particles, as will be understood from FIGS. 5 and 6.

Figure 7:
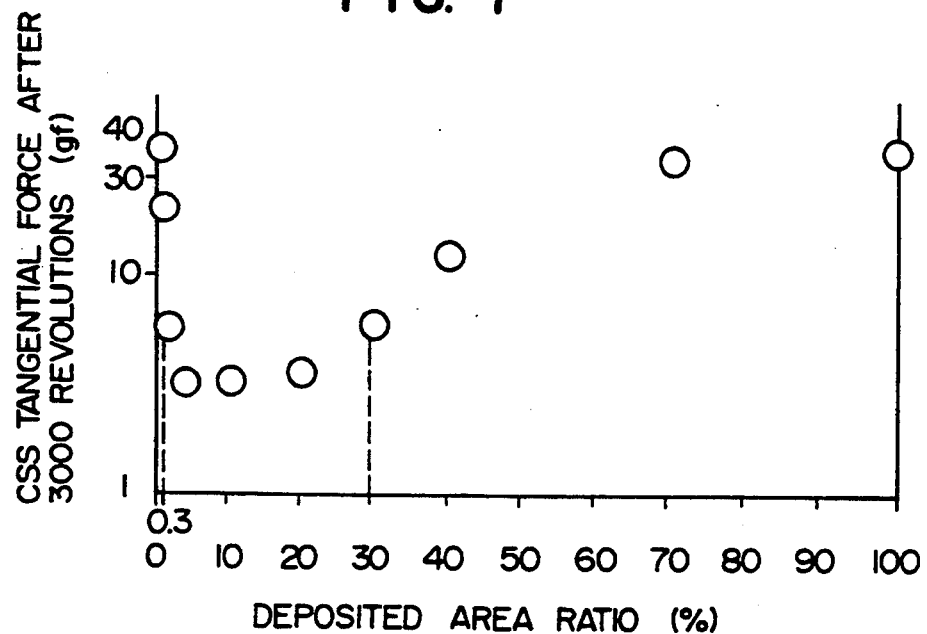
FIG. 7 is a graph showing the relationship between various deposited area ratios of fine solid particles in the disk surface and CSS (Contact-Start-Stop) tangential forces.

FIG. 7 is a graph showing results of measuring sticking forces between a magnetic disk and a magnetic head, in terms of a torque (referred to as a CSS tangential force) in the tangential direction of the magnetic disk, after repeating CSS (Contact-Start-Stop) tests 3000 times for a plurality of magnetic disks having different deposited area ratios of the fluorine-contained resin particles on the protective films. As can be seen from FIG. 7, the CSS tangential forces (i.e., the sticking forces) are small and stable (almost constant) at the deposited area ratio in the range of 0.3 to 30%.

If the deposited area ratio is less than 0.3% and the grain size of the fluorine-contained resin particles is large, the number of the projections 36a or 36a' per unit area would be so reduced that the projections 36a or 36a' could not evenly exist under a head slider cooperating with the disk, resulting in the large CSS tangential force (sticking force). Also, if the grain size of the fluorine-contained resin particles is small, the projections 36a or 36a' would be ground by contact between the disk surface and the magnetic head, resulting in the large CSS tangential force. On the other hand, if the deposited area ratio is more than 30%, the contact area between the magnetic head and the projections 36a or 36a' would be increased to produce a larger frictional force, resulting in the large CSS tangential force. In view of the above, the deposited area ratio should preferably be within the range of 0.3 to 30%.

As another experiment, in the tank 9 shown in FIG. 1, fluorine-contained resin particles (density; 2.25) were agitated and dispersed into a fluorine-contained solvent (density; 1.76), whereby a suspension (particle content; 1 g/100 cc) containing 1 g of the fluorine-contained resin particles per 100 cc of the suspension was prepared. Then, samples of the suspension were extracted from the tank 9 at upper, middle and lower levels, and dispersibility of the fluorine-contained resin particles was examined by comparing the contents of the particles.

The fluorine-contained resin particles used in the experiment are sorted into two groups, i.e., one group comprising three types of particles having different ratios (0.4, 0.3 and 0.2) of standard deviation in grain size distribution to mean grain size, and the other group comprising four types (A, B, C, D) of particles that were pulverized from a raw material through different processes in the stage of preparing the particles. The measured contents of the two groups of particles are shown in Tables 1 and 2 below. The values (contents) in Tables 1 and 2 indicate the weight (g) of the fluorine-contained resin particles per 100 cc of the suspension.

TABLE 1

| | | Standard deviation in grain size distribution/mean grain size | | |
|---|---|---|---|---|
| | | 0.4 | 0.3 | 0.2 |
| Level in tank | upper | 0.85 | 0.90 | 0.98 |
| | middle | 0.88 | 0.92 | 0.97 |
| | lower | 1.10 | 1.10 | 1.04 |

TABLE 2

| | | Types of particles | | | |
|---|---|---|---|---|---|
| | | A | B | C | D |
| Level in tank | upper | 0.85 | 0.75 | 0.62 | 1.15 |
| | middle | 0.88 | 0.80 | 0.80 | 0.95 |
| | lower | 1.10 | 1.21 | 1.32 | 1.10 |

As can be seen from Table 1, those particles which have small standard deviation in grain size distribution, i.e., concentrated distribution in grain size, exhibit a better dispersibility in the tank 9 (i.e., a smaller content difference between the upper, middle and lower levels in the tank 9).

Also, as can be seen from Table 2, dispersibility of the particles depends on the processes for pulverizing a raw material into fine particles. More specifically, the step of preparing the particles according to the method of the present invention includes a step of pulverizing a raw particle material into fine particles, the step per se being already known in the art. It has been found that the particles (type D in Table 2) which were prepared by the process including a step of removing air from the interior of each of the particles during pulverization, exhibited better dispersibility. In order to obtain a suspension having a better dispersibility, therefore, it is desirable to remove air from the interior of each particle in the particle preparing stage, thereby increasing the density of the particles to a value close to that of the suspension.

Figure 8:
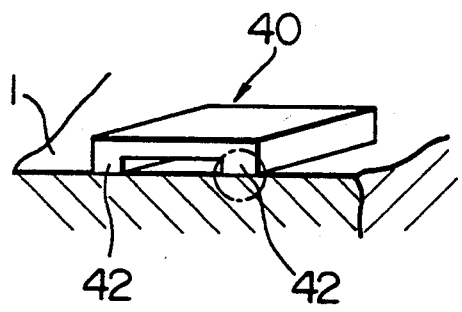
FIG. 8 is an enlarged partly sectional perspective view of a disk apparatus of the present invention, illustrating the positional relationship between a magnetic disk and a magnetic head in the disk apparatus.
Figure 9:
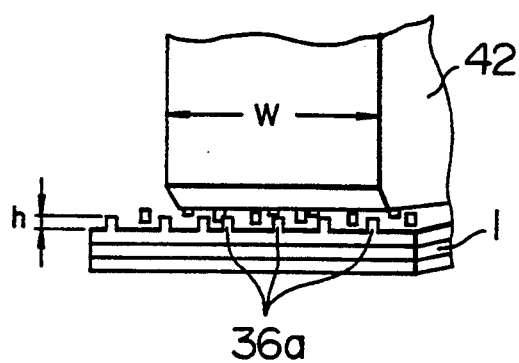
FIG. 9 is an enlarged perspective view of a portion defined by a circle in FIG. 8.

FIG. 8 shows the magnetic disk 1 manufactured through the steps described above and a magnetic head 40 used in cooperation with the disk 1. FIG. 9 shows in enlarged scale a portion surround by a circle shown in FIG. 8. As will be seen from FIG. 9, the magnetic disk 1 has a multiplicity of projections 36a formed on its surface, and the magnetic head 40 has a head slider 42 facing several projections 36a. When a disk apparatus including the magnetic disk 1 and the magnetic head 40 is operated, the magnetic head 40 is caused to lift or float from the magnetic disk surface by a small distance. This distance is referred to as a floating height in this specification.

A description will now be made of the relationship among the mean grain size of the particles 38, the width of the head slider 42, the floating height of the magnetic head 40 and other factors, which relationship provides a satisfactory result when employed in the present invention.

Figure 3A:
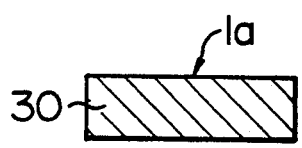
FIGS. 3A to 3E are enlarged fragmentary sectional views of a magnetic disk, respectively showing successive steps of another embodiment of the magnetic disk manufacturing method of the present invention.
Figure 3B:
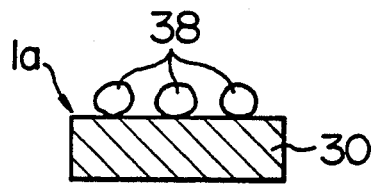
Figure 3C:
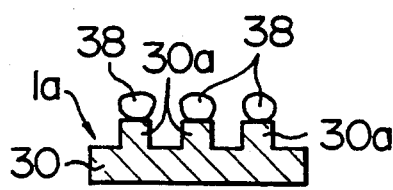
Figure 3D:
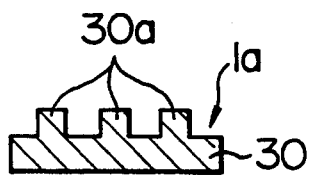
Figure 3E:
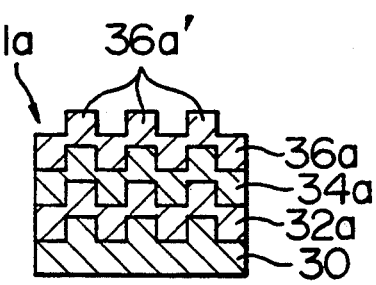

If the mean grain size of the particles 38 is less than 5 times the height h of the projections 36a or 36a', the etching gas would go around to etch away or undercut disk surface portions under the particles 38 during the dry etching step shown in FIG. 2C or 3C, so that a desired height of the projections could not be obtained. Also, if the mean grain size of the particles 38 is greater than ¼ of the width W (see FIG. 9) of the head slider 42, a sticking would be caused between the head 40 and the disk 1. Accordingly, a preferable range of the mean grain size is from 5 times the height h of the projections 36a or 36a' to ¼ of the head slider width W. Assuming now that the height of undulation of the magnetic disk 1 having the protective film 36 formed thereon or the base plate 30 of the magnetic disk is A nm and the floating height of the magnetic head from the magnetic disk is B nm, the etching depth (i.e., the height h of the projections 36a or 36a') should preferably be not more than (B−A) nm. Further, the diameter of circles equivalent to that of each of the actually formed projections 36a or 36a' should preferably be not more than ¼ of the head slider width W of the magnetic head 40.

Figure 10:
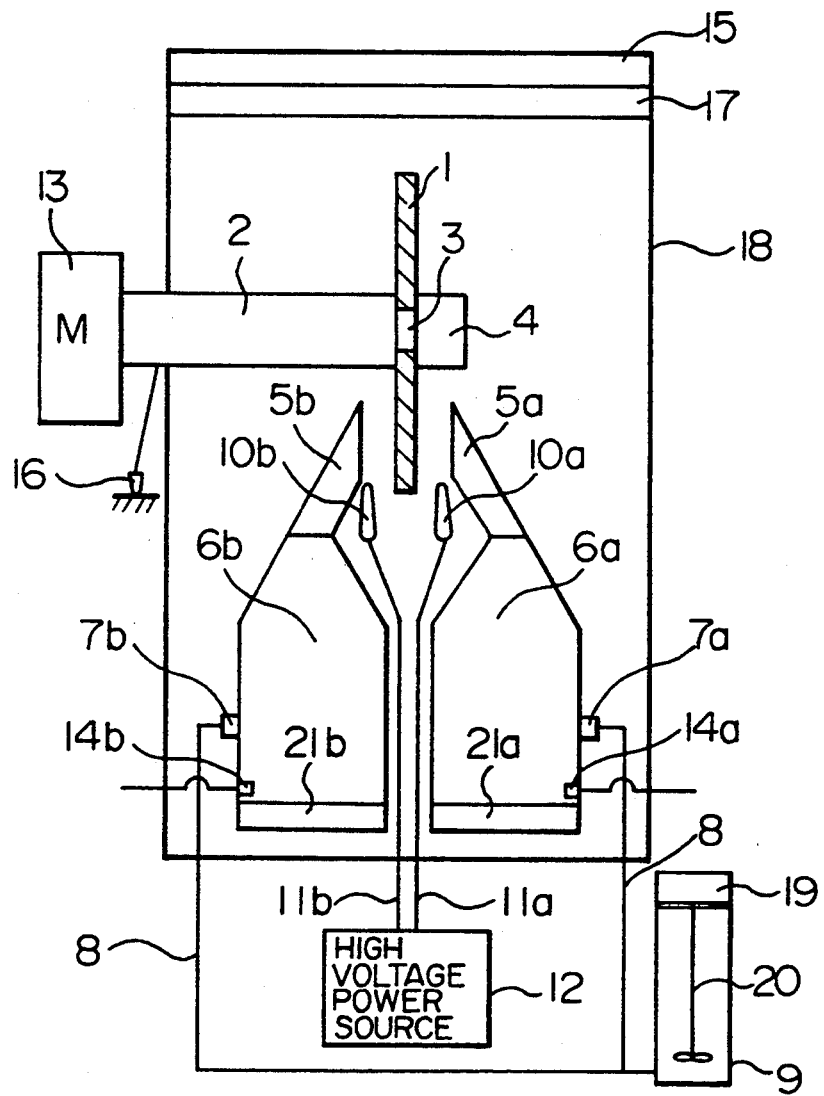
FIG. 10 is a block diagram of a second embodiment of the magnetic disk manufacturing apparatus of the present invention.

FIG. 10 is an overall schematic view showing a second embodiment of the magnetic disk manufacturing apparatus of the present invention. This embodiment is different from the first embodiment shown in FIG. 1 in that traps 21a and 21b are formed at the bottoms of the generators 6a and 6b, respectively, to store the suspension solvent. Thus, the fluorine-contained solvent is stored in the traps 21a and 21b. When the particles floating in the generators 6a and 6b become masses or agglomerate particles, the agglomerate particles fall down into the traps 21a and 21b by gravity and will no longer float in the generators 6a and 6b. Accordingly, the agglomerate particles can be prevented from being sprayed through spray nozzles 5a and 5b with the carrier gas introduced through the gas nozzles 14a and 14b. It is therefore possible to improve uniformity of the fluorine-contained resin particles electrostatically coated on both the surfaces of the magnetic disk 1.

Figure 11:
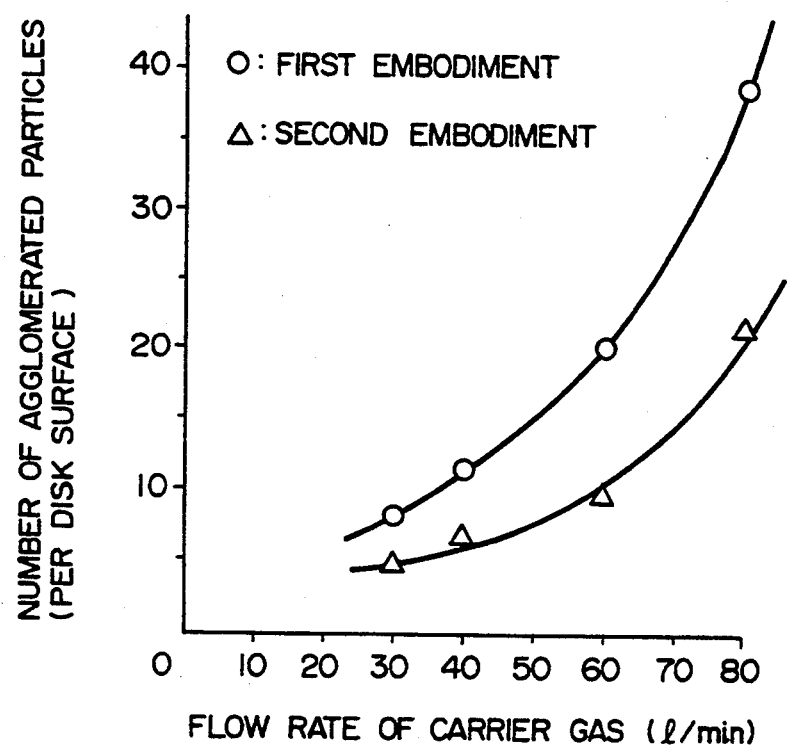
FIG. 11 is a graph showing the relationship between a flow rate of carrier gas and the number of the agglomerated fine particles among solid particles which are electrostatically deposited on the disk surface by the magnetic disk manufacturing apparatus shown in FIGS. 1 and 10.

FIG. 11 is a graph showing the relationship between a flow rate of the carrier gas and the number of agglomerate particles contained in the layer of the fluorine-contained resin particles 38 electrostatically coated on the surface of the protective film 36 of the magnetic disk 1 by each of the first and second embodiments of the magnetic disk manufacturing apparatus. The horizontal axis represents the flow rate of the carrier gas, and the vertical axis represents the number of agglomerate particles. The fluorine-contained resin particles used had the mean grain size of 5 μm. The term "agglomerate particles" means those particles that have the mean grain size not less than 15 μm. As is apparent from FIG. 11, the number of agglomerate particles is reduced about 60% in the second embodiment as compared with the first embodiment. It can be therefore understood that the second embodiment has a great advantage in reducing the number of agglomerate particles.

Figure 12:
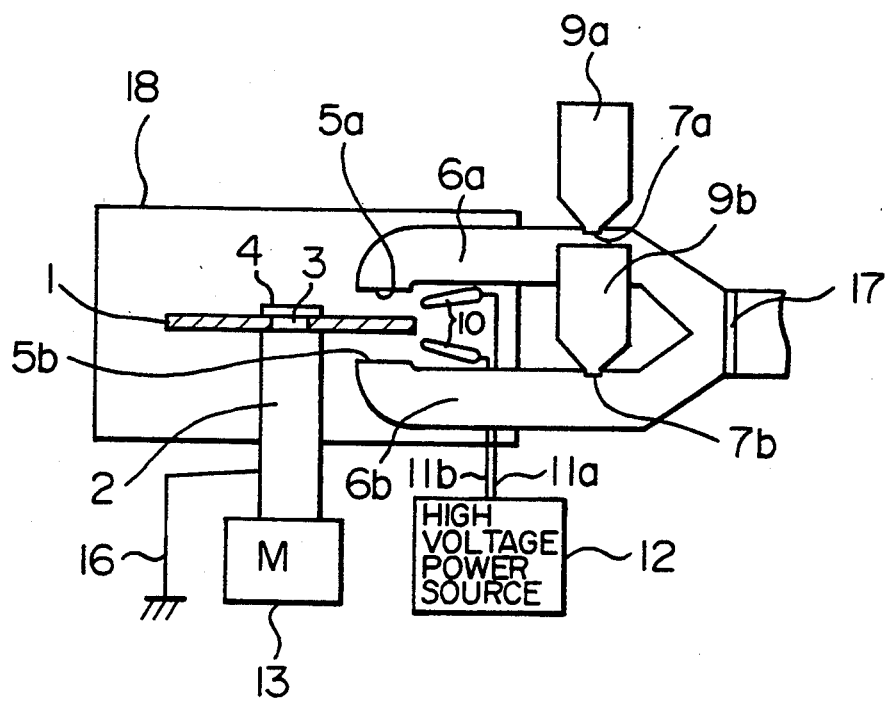
FIG. 12 is a block diagram of a third embodiment of the magnetic disk manufacturing apparatus of the present invention.

FIG. 12 is an overall schematic view showing a third embodiment of the magnetic disk manufacturing apparatus of the present invention. This embodiment employs no solvent. More specifically, as shown in FIG. 12, only the fluorine-contained resin particles are put in tanks 9a and 9b and then supplied in predetermined amount to generators 6a and 6b through injection nozzles 7a and 7b. The supplied fluorine-contained resin particles are sprayed through spray nozzles 5a and 5b with carrier gas (such as high pressure air), which is introduced through a filter 7, toward a magnetic disk 1 supported by a spindle 2 and charged with electricity by a pair of voltage applying needles 10 respectively disposed adjacent the spray nozzles 5a and 5b. The particles charged with electricity are attracted to and deposited on the surface of the magnetic disk 1 which is kept at zero potential by a grounding needle 16.

While the fluorine-contained resin particles are used as fine solid particles in the above description, the present invention is not limited to the use of fluorine-contained resin particles, and any other suitable fine solid particles can also be employed.

Additionally, using fluorine-contained resin particles as fine solid particles can provide the following merits. Fluorine-contained resin particles have no reactivity with dry etching (in other words, they are highly resistant against heat and will not be dissolved and decomposed during dry etching). Also, those particles can be easily washed away by using water, as explained above. Further, even if fluorine-contained resin particles are left on the surface of the magnetic disk and crushed into film, such a film would not affect characteristics of the magnetic disk and the CSS characteristics (in other words, it will not interfere with the protective film and the base plate of the magnetic disk.

The present invention can also be applied to the process of coating electronic component parts with fine spacer particles.

With the magnetic disk manufacturing method and apparatus of the present invention, as described above, a deposited area ratio of fine solid particles in the disk surface can be freely controlled, and a multiplicity of fine solid particles can be deposited on the disk surface independently of one another without becoming agglomerated together, thereby producing etching masks of substantially uniform size at a lower cost.

With the present invention, there is also provided a method capable of coating fine solid particles such that fine solid particles are optionally distributed over the disk surface and are satisfactorily separated from one another. As a result, it is possible to provide a magnetic disk which is surely prevented from sticking to a magnetic head and has good magnetic anisotropy, and to provide a magnetic disk apparatus including such a magnetic disk.

What is claimed is:

1. A magnetic disk manufacturing method including the steps of:
   preparing a magnetic disk with a protective film formed on its surface and supporting said magnetic disk in a space;
   preparing a multiplicity of fine solid particles;
   spraying said multiplicity of fine solid particles into said space;
   charging the thus sprayed fine solid particles with electricity of the same polarity so that said fine solid particles are floating in said space in a mutually separated state due to electric repellent forces acting between said fine solid particles;
   electrostatically depositing said fine solid particles charged with electricity on at least one portion of an outer surface of said protective film; and
   etching said at least one portion of the outer surface of said protective film by using said deposited fine solid particles as masks, thereby forming a multiplicity of projections on the outer surface of said protective film.

2. A magnetic disk manufacturing method according to claim 1, further including the step of producing a potential difference between said magnetic disk supported in said space and said fine solid particles charged with electricity.

3. A magnetic disk manufacturing method according to claim 1, wherein said fine solid particles are fluorine-contained resin particles.

4. A magnetic disk manufacturing method according to claim 3, wherein said fluorine-contained resin particles are mixed with a fluorine-contained solvent to prepare a suspension, said suspension being sprayed into said space.

5. A magnetic disk manufacturing method according to claim 4, wherein said step of preparing fine solid particles includes a step of removing air involved in said fluorine-contained resin particles so that the density of said fine solid particles becomes close to the density of said fluorine-contained solvent.

6. A magnetic disk manufacturing method according to claim 1, wherein those fine solid particles having a substantially uniform grain size distribution are selected.

7. A magnetic disk manufacturing method according to claim 1, wherein the mean grain size of said fine solid particles is within the range of from 5 times the height of said projections to ¼ of the width of a head slider of a magnetic head used in cooperation with the completed magnetic disk.

8. A magnetic disk manufacturing method according to claim 1, wherein said fine solid particles are deposited on said at least one portion of said protective film of said magnetic disk at a deposited area ratio ranging from 0.3% to 30%.

9. A magnetic disk manufacturing method according to claim 1, wherein said fine solid particles are made of hydrophobic material.

10. A magnetic disk manufacturing method according to claim 1, wherein, assuming that the height of undulation of the outer surface of said protective film is A nm and the floating height of a magnetic head used in cooperation with the completed magnetic disk is B nm, said etching step is carried out such that the height of said projections is not more than (B−A) nm and the diameter of each of the circles equivalent to those of said projections is not more than ¼ of the width of a head slider of said magnetic head.

11. A magnetic disk manufacturing method including the steps of:
    preparing a base plate for a magnetic disk and supporting said base plate in a space;
    preparing a multiplicity of fine solid particles;
    spraying said multiplicity of fine solid particles into said space;
    charging the thus sprayed fine solid particles with electricity of the same polarity so that said fine solid particles are floating in said space in a mutually separated state due to electric repellent forces acting between said fine solid particles;
    electrostatically depositing said fine solid particles charged with electricity on at least one portion of an outer surface of said magnetic disk base plate; and
    etching said at least one portion of the outer surface of said base plate by using said deposited fine solid particles as masks, thereby forming a multiplicity of projections on the outer surface of said base plate.

12. A magnetic disk manufacturing method according to claim 11, further including the step of producing a potential difference between said base plate supported in said space and said fine solid particles charged with electricity.

13. A magnetic disk manufacturing method according to claim 11, wherein said fine solid particles are fluorine-contained resin particles.

14. A magnetic disk manufacturing method according to claim 13, wherein said fluorine-contained resin particles are mixed with a fluorine-contained solvent to prepare a suspension, said suspension being sprayed into said space.

15. A magnetic disk manufacturing method according to claim 14, wherein said step of preparing fine solid particles includes a step of removing air involved in said fluorine-contained resin particles so that the density of said fine solid particles becomes close to the density of said fluorine-contained solvent.

16. A magnetic disk manufacturing method according to claim 11, wherein those fine solid particles having a substantially uniform grain size distribution are selected.

17. A magnetic disk manufacturing method according to claim 11, wherein the mean grain size of said fine solid particles is within the range of from 5 times the height of said projections to ¼ of the width of a head slider of a magnetic head used in cooperation with the completed magnetic disk.

18. A magnetic disk manufacturing method according to claim 11, wherein said fine solid particles are deposited on said at least one portion of said base plate at a deposited area ratio ranging from 0.3% to 30%.

19. A magnetic disk manufacturing method according to claim 11, wherein said fine solid particles are made of hydrophobic material.

20. A magnetic disk manufacturing method according to claim 11, wherein, assuming that the height of undulation of the outer surface of said base plate is A nm and the floating height of a magnetic head used in cooperation with the completed magnetic disk is B nm, said etching step is carried out such that the height of said projections is not more than (B−A) nm and the diameter of each of circles equivalent to those of said projections is not more than ¼ of the width of a head slider of said magnetic head.

21. A magnetic disk manufacturing method according to claim 1, wherein said step of electrostatically depositing said fine solid particles on said magnetic disk is carried out while said magnetic disk is rotated.

22. A magnetic disk manufacturing method according to claim 11, wherein said step of electrostatically depositing said fine solid particles on said base plate for said magnetic disk is carried out while said base plate is rotated.

23. A method of forming projections on at least major portions of both surfaces of a disk, said method comprising the steps of:

supporting said disk such that said major portions of both surfaces of said disk are exposed to a first space;

injecting a suspension of a multiplicity of fine solid particles and a disperser into a second space so that said disperser is evaporated and said multiplicity of fine solid particles are floating in said second space in a mutually separated state;

spraying the thus separated fine solid particles and said evaporated disperser from said second space through spray means toward said major portions of both surfaces of said supported disk; and charging said sprayed fine solid particles with electricity of the same polarity;

electrostatically coating said multiplicity of fine solid particles charged with electricity on said major portions of both surfaces of said disk, and controlling a deposited area ratio of said fine solid particles in both surfaces of said disk by carrying out at least one of selecting a grain size of said fine solid particles, controlling a content of said fine solid particles in said disperser and changing the relative positions of said spray means with respect to both surface of said disk.

* * * * *